United States Patent Office 3,383,400
Patented May 14, 1968

3,383,400
ACYLATED UREA POLYISOCYANATES AND
PROCESS FOR THE PREPARATION THEREOF
Ernst Meisert, Leverkusen-Schlebusch, Gerhard Mennicken, Opladen, and Kuno Wagner, Leverkusen, Germany, assignors to Farbenfabriken Bayer Aktiengesellschaft, Leverkusen, Germany, a German corporation
No Drawing. Filed Jan. 5, 1965, Ser. No. 423,599
Claims priority, application Germany, Jan. 11, 1964,
F 41,720
7 Claims. (Cl. 260—453)

ABSTRACT OF THE DISCLOSURE

Acylated urea polyisocyanates are prepared by reacting an aliphatic diisocyanate with an aliphatic dicarboxylic acid in such proportions that there are at least 4 mols of organic polyisocyanate per mol of dicarboxylic acid. These polyisocyanate products may be used as adhesives; components in the production of plastics, lacquers and coatings or in the preparation of various polyurethanes.

This invention relates to polyisocyanates and more particularly to acylated urea polyisocyanates and a method for the preparation thereof It is known that acid amides are obtained by reacting monoisocyanates with monocarboxylic acids. Organic polyisocyanates containing a biuret structure are obtained by reacting organic diisocyanates with water. It is possible to use in addition to water hydrogen sulphide or urea diisocyanates, all of said reactions being preferably carried out at temperatures from about 70° to 200° C. In addition to water, it is possible to use compounds which give off water, especially dicarboxylic acids which readily change into the anhydrides. Aliphatic isocyanates and aliphatic acids usually yield mixed anhydrides that subsequently decompose to substituted amides. On the other hand, aromatic isocyanates combined with aliphatic acids or weak aromatic acids at moderate temperatures to give other anhydrides and eventually acid anhydride, urea and carbon dioxide. Mixed anhydrides decompose to carbanilide and the acid anhydride.

It is therefore an object of this invention to provide a process for the preparation of polyisocyanates. Another object of this invention is to provide a method for preparing polyisocyanates having acylated urea structures. Another object of this invention is to provide a method for preparing polyisocyanates without the formation of the anhydrides. Still another object of this invention is to provide a method for preparing polyisocyanates substantially free of by-products. A further object of this invention is to provide for a more complete reaction of the components in the formation of the acylated urea polyisocyanates. A still further object of this invention is to provide polymers which may be easily separated from monomeric isocyanates.

The foregoing objects and others which will become apparent from the following description are accomplished in accordance with the invention, generally speaking, by providing a process for the preparation of acylated urea polyisocyanates wherein an organic aliphatic diisocyanate is reacted with an aliphatic dicarboxylic acid at a temperature of from about 50° to about 200° C. Unexpectedly, the anhydride is not formed in this reaction with the resulting splitting off of carbon dioxide. This method of formation of acylated urea polyisocyanates is critically limited to aliphatic diisocyanates and aliphatic dicarboxylic acids. The term aliphatic here includes cycloaliphatic, as well as substituted alphatic and cycloaliphatic radicals.

It was known prior to the process of the present invention that the reaction of isocyanates with carboxylic acids yield mixed anhydrides of carbamic and carbonic acids, the stability of which depended on the acidity of the carboxylic acid and the reactivity of the isocyanates. The mixed anhydrides obtained from very weak acids and very highly reactive aromatic isocyanates, even though substituted with nitro groups, decompose upon moderate heating to form carboxylic acid amides with the evolution of carbon dioxide. Generally, when dicarboxylic acids are reacted with an organic polyisocyanate, preferably a monomeric organic diisocyanate such as hexamethylene diisocyanate, anhydrides are formed with the spontaneous evolution of carbon dioxide, however, in the instant process, anhydrides are not formed with the accompanying evolution of carbon dioxide.

The process of the invention yields an acylated urea polyisocyanate having the following formula:

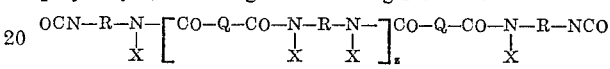

wherein R is an alkylene (including cycloalkylene) radical obtained by removing the NCO group from an organic diisocyanate, Q is an alkylene (including cycloalkylene) radical having more than 3 carbon atoms, X is hydrogen or —CO—NH—R—NCO and Z is an integer from 1 to 10, preferably from 1 to 6 with the proviso that there is at least one —CO—NH—R—NCO grouping present. The alkylene radicals may be substituted or contain hetero atoms depending on the constituency of the original diisocyanate or dicarboxylic acid.

It is preferred to react at least 4 mols of a monomeric aliphatic diisocyanate per mol of polycarboxlic acid at a temperature of from about 50° to about 200° C. at least toward the end of the reaction until at least the carbon dioxide evolution is completed. While at least 4 mols of aliphatic diisocyanate should be present per mol of dicarboxylic acid, it is more advantageous to use larger excesses of aliphatic diisocyanate, i.e., preferably from about about 6 to 30 mols of monomeric aliphatic diisocyanate per mol of dicarboxylic acid. A small excess of diisocyanate gives products of higher molecular weight, and a reaction for a longer time or at higher temperatures gives a more branched product for an increasing number of isocyanate groups. When larger excesses are used the diisocyanate functions as a solvent for the reactants and for the acylated urea product thus formed. After completing the reaction, the monomeric aliphatic diisocyanate can be separated by conventional processes such as distillation, thin film evaporation or extraction from the acylated urea polyisocyanate product.

Alternatively, one may carry out the reaction in the presence of an inert organic solvent. By inert is meant organic solvents which are free of active hydrogen containing groups capable of reacting with NCO groups. Use of a solvent is sometimes advantageous to moderate the reaction by dilution and by reflux distillation of the solvent and to facilitate purification of the product. If a solvent is used it should preferably dissolve all of the reactants but it should not react with the reactants or the product to any significant extent. In addition, it should not unduly retard the rate of reaction and should be easily separable from the reaction product. Thus, solvents which may be employed are, for example, aliphatic or aromatic hydrocarbons having a boiling point within the reaction temperature, such as ligroin, natural or synthetic hydrocarbon mixtures (B.P. above 50° C.), benzene, xylene and the like. One may also use esters such as ethyl acetate, ethylglycol acetate, butylacetate, methylglycolacetate, butylglycol acetate. Dioxane, tetrahydrofurane and dibutylether are also to be mentioned.

The reaction between dicarboxylic acid and the aliphatic polyisocyanate proceeds rather rapidly and smoothly with the evolution of stoichiometric quantities of carbon dioxide. The reaction time should be sufficient for the complete evolution of carbon dioxide. It may range from about 15 minutes up to about 24 hours, depending on the reaction temperature.

It is also possible to produce acylated urea polyisocyanates in accordance with the process of the invention in stages, for example, one may combine reactants such as hexamethylene diisocyanate and a dicarboxylic acid at a temperature of about 50° C. to form a complex which is then decomposed by further heating in a first step with the evolution of carbon dioxide. In a second stage, the reaction mixture is heated to a higher temperature in the range of from about 150° to about 200° C. In the second stage, the additional isocyanate reactions take place with the formation of the acylated urea polyisocyanates.

Any suitable monomeric aliphatic diisocyanate of the formula OCN—R—NCO wherein R is an aliphatic group are suitable for the production of acylated urea polyisocyanates such as, for example, tetramethylene diisocyanate, pentamethylene diisocyanate, hexamethylene diisocyanate, cyclohexane - 1,4 - diisocyanate, dicyclohexyl-methane - 4,4' - diisocyanate, thiodiethyldiisocyanate, β-methylbutanediisocyanate, 3-methoxyhexanediisocyanate, 3-butoxyhexanediisocyanate, ω,ω' - diisocyanato-1,4 - dimethylcyclohexane, cyclohexane, 1,3 - diisocyanate, 1-methylcyclohexane-2,4 - diisocyanate, dicyclohexyl - di-methylmethane-diisocyanate, 2,2 - dimethylpentanediisocyanate, 1,3-di-(isocyanato methyl)- cyclobutane. In addition, small quantities of monoisocyanates such as phenyl isocyanate and cyclohexyl isocyanate, and of polyisocyanates of higher valency can concurrently be employed.

The diisocyanates may be reacted with any suitable aliphatic dicarboxylic acid having the following general formula

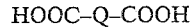
HOOC–Q–COOH wherein Q is an aliphatic group having from 4 to 30 carbon atoms, more preferably from 4 to 24 carbon atoms. The aliphatic group may be a saturated or unsaturated, substituted or unsubstituted aliphatic or cycloaliphatic group. Examples of an alkylene radical are tetramethylene, pentamethylene, hexamethylene, heptamethylene and octamethylene which can also be substituted by alkyl and aryl groups.

Examples of dicarboxylic acids which may be used for the purpose of the invention include glutaric acid, methyl glutaric acid, adipic acid, methyladipic acid, 3-methylpentanedioic acid, β,β'-dichloro adipic acid, α,β-dimethyl glutaric acid, sebacic acid, thiodiglycolic acid, hexahydro phthalic acid, pimelic acid, suberic acid, α-methyl pimelic acid.

It is possible to modify the acylated urea isocyanates by including in the reaction mixture a small quantity of a compound having hydrogen atoms reactive with an NCO group such as, for example, a polyhydric alcohol including ethylene glycol, trimethylol propane and the like, diphenyl urea, carboxylic acid amides such as adip-amide, and the like, and phenylbutyl urea.

The reaction products obtained by the process according to the invention, depending upon the nature of the diisocyanate used, can be highly viscous liquids, clear resins or partly crystalline and partly waxy amorphous products. They have very good solubility in the conventional organic solvents such as aromatic hydrocarbons and aliphatic esters, which do not contain any labile hydrogen atoms. Examples of organic solvents are dioxane, tetrahydrofuran, benzene, xylene, ethyl acetate, ethylglycol acetate and mixtures thereof. The products of this process are insoluble or sparingly soluble in petroleum hydrocarbons so that they can be easily separated by fractional precipitation from a solution of excess monomeric diisocyanate and can be recovered as colorless or yellow, viscous or solid resins.

The acylated urea isocyanates provided by this invention are valuable components in the production of plastics and are especially suitable in conjunction with known polyhydroxy compounds in the formation of lightfast lacquers and coatings. These acylated urea isocyanates may be used as adhesives or in the preparation of compositions which will form polyurethane coatings such as, for example, a composition containing a polyester and an acylated urea isocyanate. They may also be reacted with organic compounds having hydrogen atoms active with and NCO group such as polyesters and polyalkylene ether glycols to form cellular polyurethanes or homogeneous non-porous polyurethanes. The cellular polyurethanes may be used for making sponges, insulation and the like.

The invention is further illustrated but is not intended to be limited by the following examples in which all parts and percentages are by weight unless otherwise specified.

EXAMPLE 1

About 3000 parts of hexamethylene diisocyanate are heated to about 150° C. About 111 parts of powdered adipic acid are introduced over a period of about 30 minutes with stirring, and heated for about an additional hour at about 150° C. The crude product obtained contains about 45.6% of isocyanate groups. By thin-film distillation at about 160° at a pressure of about 2 mm. Hg., about 2515 parts of the excess hexamethylene diisocyanate are distilled off and about 547 parts of a viscous and almost colorless resin are obtained. This resin contains about 23.6% of isocyanate groups and is completely soluble in a mixture of ethyl glycol acetate and xylene (1:1. About 75% of the solution contains about 17.8% of isocyanate groups and has a viscosity of about 142 cps./25° C.

From the proportion of hexamethylene diisocyanate which is reacted per mol of adipic acid, an average molecular weight of about 730 is calculated for the polyisocyanate obtained. This shows good conformity with the values found for the molecular weight and with the isocyanate group content (calculated about 23.1%; found about 23.6%).

EXAMPLE 2

About 109.5 parts of adipic acid are introduced into about 1000 parts of hexamethylene diisocyanate at about 150° C. and heated for about three hours, about 66 parts of carbon dioxide being split off. About 1030 parts of the reaction mixture are freed from excess hexamethylene diisocyanate at about 160° C. and about 1.5 mm. Hg in a thin-film evaporator and about 470 parts of a very viscous polyisocyanate are obtained, about a 75% solution of which in ethyl glycol acetate and xylene (1:1) contains about 15.5% of isocyanate groups and shows a dynamic viscosity of about 664 cps./25° C.

From the ratio between the reacted reaction components, an approximate molecular weight of about 1260 is calculated.

EXAMPLE 3

About 1000 parts of hexamethylene diisocyanate and about 47 parts of azelaic acid are reacted in the manner described in Example 1 and freed from excess hexamethylene diisocyanate by thin-film distillation. About 215 parts of a yellowish viscous resin are obtained, about a 75% solution of which in ethyl glycol acetate and xylene (1:1) contains about 17.5% of isocyanate groups and has a dynamic viscosity of about 152 cps./25° C.

EXAMPLE 4

About 1000 parts of hexamethylene diisocyanate and about 50.5 parts of sebacic acid are reacted and worked up as described in Example 1. About 220 parts of a yellowish colored syrupy polyisocyanate are obtained as distillation residue. This resin is soluble in aromatic hydrocarbons and in esters and contains about 22.3% of isocyanate groups.

EXAMPLE 5

A total of about 50 parts of sebacic acid is added in portions at about 130°–140° C. to about 840 parts of tetramethylene diisocyanate. After about two hours, the isocyanate group content of the mixture has fallen to about 50.7%. The reaction mixture is then treated at about 160° C. and about 1 mm. Hg is a thin-film evaporator. The resin (about 200 parts) remaining as distillation residue contains about 23.4% of isocyanate groups and is viscous, odorless and colorless and soluble in aromatic hydrocarbons or in aliphatic esters.

EXAMPLE 6

About 332 parts of cyclohexane-1,4-diisocyanate are dissolved in about 345 parts of ethyl glycol acetate and heated to about 150° C. About 12.2 parts of adipic acid are introduced in small portions into the hot solution. A slight amount of sediment is formed, which is filtered off (melting point above about 350° C.). The filtrate is freed from excess monomeric diisocyanate and ethyl glycol acetate in a thin-film evaporator. As disaillation residue, a brittle, yellow resin (about 48 parts) remains with an icocyanante group content of about 20.1%.

It is to be understood that the foregoing examples are given for the purpose of illustration and that any other suitable organic polycarboxylic acid or the like could have been used therein provided that the teachings of this disclosure are followed.

Although the invention has been described in considerable detail in the foregoing, it is to be understood that such detail is solely for the purpose of illustration and that variations can be made therein by those skilled in the art without departing from the spirit and scope of the invention except as set forth in the claims.

What is claimed is:

1. A composition of the formula

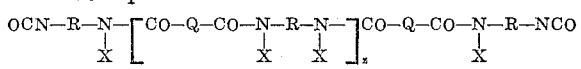

wherein R is an aliphatic group, Q is an aliphatic group having at least about 4 carbon atoms, X is selected from the group consisting of hydrogen and

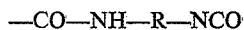

and Z is an integer of from 1 to 6 with the proviso that there is at least one —CO—NH—R—NCO grouping present.

2. A composition of the formula

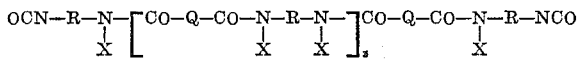

wherein R is an alkylene group, Q is an alkylene group having at least about 4 carbon atoms, X is selected from the groups consisting of hydrogen and

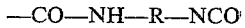

and Z is an integer of from 1 to 6 with the proviso that there is at least one —CO—NH—R—NCO grouping present.

3. A process for the preparation of acylated urea polyisocyanates which comprises reacting at a temperature of from about 50 to about 200° C. an aliphatic diisocyanate with an aliphatic dicarboxylic acid in such proportions that there are at least about 4 mols of organic polyisocyanate present per mol of dicarboxylic acid.

4. The process of claim 3 wherein the reaction is carried out in the presence of an inert organic solvent.

5. The process of claim 3 wherein about 4 to 30 mols of organic polyisocyanate are initially present per mol of dicarboxylic acid.

6. A process for the preparation of acylated urea polyisocyanates which comprises reacting hexamethylene diisocyanate with adipic acid at a temperature of from about 50 to about 150° C. in such proportions that there are at least about 4 mols of diisocyanate present per mol of adipic acid.

7. A process for the preparation of acylated urea polyisocyanates which comprises reacting at a temperature of from about 50 to about 200° C. an aliphatic diisocyanate of the formula OCN—R—NCO with an aliphatic dicarboxylic acid of the formula

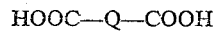

wherein R is an aliphatic group and Q is an aliphatic group having at least 4 carbon atoms in such proportions that there are at least about 4 mols of aliphatic diisocyanate present per mol of aliphatic dicarboxylic acid.

References Cited

UNITED STATES PATENTS

| | | | |
|---|---|---|---|
| 2,268,586 | 1/1942 | Gilman | 260—77.5 X |
| 3,124,605 | 3/1964 | Wagner | 260—453 |

OTHER REFERENCES

Gudgeon et al.: Journal of the Oil and Colour Chemists Assoc., vol. 42, No. 10 (1959), pages 677–678 relied upon.

CHARLES B. PARKER, *Primary Examiner.*

D. H. TORRENCE, *Assistant Examiner.*